United States Patent
Sakoda (10) Patent No.: US 7,176,401 B2
(45) Date of Patent: Feb. 13, 2007

(54) METHOD AND DEVICE FOR WELDING AN ALUMINUM-BASED STUD

(75) Inventor: Kanji Sakoda, Aichi-ken (JP)

(73) Assignee: Newfrey LLC, Newark, DE (US)

( * ) Notice: Subject to any disclaimer, the term of this patent is extended or adjusted under 35 U.S.C. 154(b) by 284 days.

(21) Appl. No.: 10/482,470

(22) PCT Filed: Jul. 2, 2002

(86) PCT No.: PCT/US02/21079

§ 371 (c)(1),
(2), (4) Date: Dec. 30, 2003

(87) PCT Pub. No.: WO03/004209

PCT Pub. Date: Jan. 16, 2003

(65) Prior Publication Data

US 2004/0169017 A1    Sep. 2, 2004

(30) Foreign Application Priority Data

Jul. 4, 2001    (JP) .............................. 2001-203570

(51) Int. Cl.
*B23K 9/20* (2006.01)
(52) U.S. Cl. ......................................... 219/99; 219/98
(58) Field of Classification Search .................. 219/98, 219/99
See application file for complete search history.

(56) References Cited

U.S. PATENT DOCUMENTS 3,188,730 A    6/1965    Meyer (Continued)

FOREIGN PATENT DOCUMENTS

DE    296 10 640 U1    11/1996

(Continued)

OTHER PUBLICATIONS

Taylor Lyman, editor, "Metals Handbook", 8th Edition, vol. 6, Welding and Brazing, 1971, American Society for Metals, pp. 167-175.*

(Continued)

*Primary Examiner*—Clifford C. Shaw
(74) *Attorney, Agent, or Firm*—Harness, Dickey & Pierce, P.L.C.

(57) ABSTRACT

A method of welding a stud (11) is provided. In another aspect of the present invention, a welding system is provided for a weld stud (11). A further aspect of the present invention employs a weld stud (11) with a substantially conical end section (29). Still another aspect of the present invention includes a welding method, wherein an aluminum or aluminum alloy stud (11) is brought into contact with an aluminum or aluminum alloy base material (14), voltage is applied between the stud (11) and the base material (14), the stud (11) is lifted slightly off the base material (14), an arc is generated, the tip of the stud (11) and the section of the base material (14) to be melted are melted, pressure is applied to the tip of the stud (11) and the section of the base material (14) that has been melted and the stud (11) and base material (14) are welded together, the current is divided into at least three stages and incrementally increased from the beginning to the end while the main arc is generated, and/or the molten tip of the aluminum or aluminum alloy stud (11) is applied under pressure to the molten base material (14) in under five milliseconds after the arc current has been cut off.

26 Claims, 5 Drawing Sheets

U.S. PATENT DOCUMENTS

| | | | |
|---|---|---|---|
| 3,290,852 A | | 12/1966 | Meyer |
| 3,760,143 A | | 9/1973 | Rondeau et al. |
| 4,797,529 A | * | 1/1989 | Schmitt et al. ............... 219/99 |
| 5,252,802 A | * | 10/1993 | Raycher ...................... 219/98 |
| 5,317,123 A | | 5/1994 | Ito |
| 5,393,164 A | | 2/1995 | Renner et al. |
| 5,414,234 A | | 5/1995 | Kito |
| 5,461,209 A | | 10/1995 | Yamada et al. |
| 5,938,945 A | | 8/1999 | Hofmann et al. |

FOREIGN PATENT DOCUMENTS

| | | |
|---|---|---|
| DE | 195 39 791 A1 | 4/1997 |
| DE | 199 25 628 A1 | 12/2000 |
| DE | 100 01 344 A1 | 7/2001 |
| JP | 63-173583 | 11/1988 |
| WO | WO 97/35684 | 10/1997 |
| WO | WO 01/51241 A1 | 7/2001 |

OTHER PUBLICATIONS

Emhart-Warren Drawing No. 29482, Xmas Stud (believed to have been offered for sale prior to Jul. 2001).

International Search Report, dated Oct. 23, 2002, 3 pages.

* cited by examiner

Weld Parameters

| Stud | Work piece Material | Stud Material | Weld current Voltage [V] | Lift Height [mm] | Step 1 | | Step 2 | | Step 3 | |
|---|---|---|---|---|---|---|---|---|---|---|
| | | | | | Current [A] | Time [ms] | Current [A] | Time [ms] | Current [A] | Time [ms] |
| T-stud | A7N01 | A5056 | 18 | 2.3 | 100 | 20 | 170 | 10 | 290 | 13 |
| | A5052 A5083 | A5056 | 18 | 2.3 | 100 | 20 | 170 | 10 | 260 | 13 |
| | A6063 A6K21 | A5056 | 18 | 2.3 | 100 | 20 | 170 | 10 | 320 | 12 |
| | AC4C ADC12 | A5056 | 18 | 2.3 | 100 | 20 | 170 | 10 | 340 | 12 |
| T5 Xmas (SWB400) | A5052 A6K21 A6N01 SF36 | AlMg5 | 24 | 2.3 | 900 | 5 | 900 | 5 | 1200 | 5 |

Fig. 6

METHOD AND DEVICE FOR WELDING AN ALUMINUM-BASED STUD

BACKGROUND AND SUMMARY OF THE INVENTION

The present invention relates to a method and device for welding an aluminum or aluminum alloy stud and, more specifically, to a welding method and device in which a stud is brought into contact with a base material, voltage is applied between the stud and the base material, the stud is lifted slightly off the base material, an arc is generated between the stud and the base material, the tip of the stud and the section of the base material to be melted are melted, pressure is applied to the tip of the stud and the section of the base material that has been melted, and the stud and base material are welded together after the current has been cut off.

In a well known method, a stud is brought into contact with a base material, voltage is applied between the stud and the base material, the stud is lifted slightly off the base material, an arc is generated between the stud and the base material, the tip of the stud and the section of the base material to be melted are melted, pressure is applied to the tip of the stud and the section of the base material that has been melted, and the stud and base material are welded together after the current has been cut off. In Japanese Utility Model Application Disclosure No. 5-49172 and Japanese Utility Model Application Disclosure No. 6-48967, a pilot arc with a small amount of current is generated, the main arc with a large amount of current is generated, the tip of the stud and the section of the base material to be melted are melted, pressure is applied to the tip of the stud and the section of the base material that has been melted and the stud and base material are welded together (the so-called drawn arc method). In automobile manufacturing, aluminum and aluminum alloy vehicle frames and bodies are also increasingly being used because of their lighter weight. In Japanese Utility Model Application No. 63-173583, a T stud consisting of a large-diameter head and a rod-shaped shaft is welded to a vehicle frame, and a clip for securing a member such as wiring is fastened to the T stud.

Figure 1:
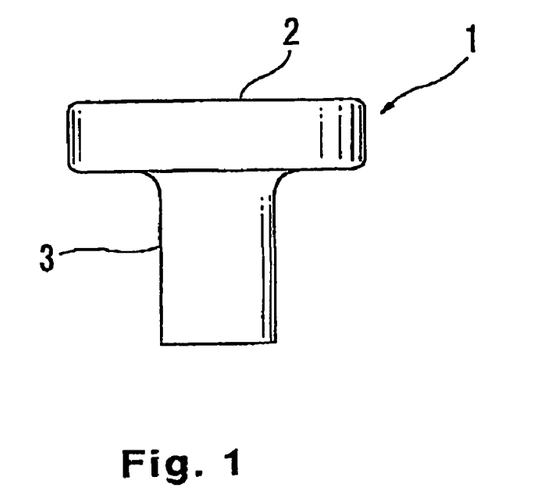
FIG. 1 is a front view of an iron-based T stud of the prior art.

Technologies have already been developed to weld T studs to vehicle bodies and frames when the bodies and the T studs are made from iron-based metals. In these welding technologies, the T stud is welded to the body or frame while maintaining a constant level of strength. For example, when the iron-based T stud 1 in FIG. 1 has a 5-mm diameter head 2 and a 3-mm long, 3-mm diameter rod-shaped shaft 3, the height of the stud 1 below the neck after being welded to a base material 5 such as an iron-based body is about 2.6 mm, the reinforcing height (h) of the reinforcement 6 is less than 1 mm, and the diameter (d) of the reinforcement 6 is less than 5 mm. In this way, enough space remains on the shaft 3 of the molten T stud 1 to accommodate the clip disclosed in Japanese Utility Model Application Disclosure No. 63-173583, and attach the clip properly and securely.

However, this technology was developed to weld an iron-based T stud to an iron-based base material. When the base material of the body or frame consists of an aluminum-based metal such as aluminum or an aluminum alloy, it is difficult to weld an iron-based T stud to it. If a stud consisting of an aluminum-based metal such as aluminum or an aluminum alloy is welded in the same manner as an iron-based stud, the proper height below the neck, reinforcing height, and welding spot diameter cannot be reliably obtained. In addition, the strength after welding varies and a stable welding strength cannot be obtained. Therefore, the purpose of the present invention is to provide a stud welding method and device able to reliably obtain the desired welding profile and welding strength even when the stud is made from aluminum or an aluminum alloy.

In accordance with the present invention, a method of welding a stud is provided. In another aspect of the present invention, a welding system is provided for a weld stud. A further aspect of the present invention employs a weld stud with a substantially conical end section. Still another aspect of the present invention includes a welding method, wherein an aluminum or aluminum alloy stud is brought into contact with an aluminum or aluminum alloy base material, voltage is applied between the stud and the base material, the stud is lifted slightly off the base material, a pilot arc with a small amount of current is generated, the main arc with a large amount of current is generated, the tip of the stud and the section of the base material to be melted are melted, pressure is applied to the tip of the stud and the section of the base material that has been melted and the stud and base material are welded together, and the current is divided into stages and incrementally increased as the main arc is generated from beginning to end, and/or the molten tip of the stud is applied under pressure to the molten base material in under five milliseconds after the main arc current has been cut off.

The present invention also includes a welding device, wherein an aluminum or aluminum alloy stud is brought into contact with an aluminum or aluminum alloy base material, voltage is applied between the stud and the base material, the stud is lifted slightly off the base material, a pilot arc with a small amount of current is generated, the main arc with a large amount of current is generated, the tip of the stud and the section of the base material to be melted are melted, pressure is applied to the tip of the stud and the section of the base material that has been melted and the stud and base material are welded together, the current is divided into stages from beginning to end and incrementally increased as the main arc is generated, and/or the molten tip of the stud is applied under pressure to the molten base material in under five milliseconds after the main arc current has been cut off. As a result, the desired height below the neck in the stud after welding (L in FIG. 2) is reliably obtained, the welding strength is high, and the reinforcement height (h in FIG. 2) and the diameter of the melted section of the base material (d in FIG. 2) are kept within the proper range.

In another aspect of the welding device and method of the present invention, there are three steps and the main arc in the first step is a small-current arc effective at removing oil from the surface and surroundings of the section of the base material to be melted, the main arc in the second step is an intermediate-current arc for melting the tip of the stud and the section of the base material to be melted and for keeping the area of the section of the base material to be melted within a predetermined range, and the main arc in the third step is a large-current arc for melting the tip of the stud and the section of the base material to be melted into each other deeply. A further aspect of the present invention uses a T stud having a large-diameter head and a rod-shaped shaft, and the profile of the end of the shaft is conical with a flat tip. As a result, the arc is concentrated in the center, the reinforcement does not tilt to one side, and the height of the reinforcement is kept from getting shorter. A pilot arc is not absolutely necessary.

Still another aspect of the present invention includes a welding method, wherein an aluminum or aluminum alloy stud is brought into contact with an aluminum or aluminum alloy base material, voltage is applied between the stud and the base material, the stud is lifted slightly off the base material, an arc is generated, the tip of the stud and the section of the base material to be melted are melted, pressure is applied to the tip of the stud and the section of the base material that has been melted and the stud and base material are welded together, the current is divided into at least three stages and incrementally increased from the beginning to the end while the main arc is generated, and/or the molten tip of the aluminum or aluminum alloy stud is applied under pressure to the molten base material in under five milliseconds after the arc current has been cut off. As a result, an aluminum-based stud can be welded properly.

Similarly, in still a further aspect of the present invention, a welding device or system is used wherein an aluminum or aluminum alloy stud is brought into contact with an aluminum or aluminum alloy base material, voltage is applied between the stud and the base material, the stud is lifted slightly off the base material, an arc is generated, the tip of the stud and the section of the base material to be melted are melted, pressure is applied to the tip of the stud and the section of the base material that has been melted and the stud and base material are welded together, the current is divided into stages and incrementally increased from beginning to end as the arc is generated, and/or the molten tip of the aluminum or aluminum alloy stud is applied under pressure to the molten base material in under five milliseconds after the main arc current has been cut off. As a result, an aluminum-based stud can be welded properly.

Various embodiments of the present invention are advantageous over prior devices. For example, because the main arc current of the present invention is divided into stages and increases incrementally in this welding method, the welding area of the section of the base material to be melted is kept within the desired range when the tip of the stud is being welded to the section of the base material to be melted, the tip of the stud and the section of the base material to be melted are melted into each other deeply, and the heat introduced to the stud and base material remains constant. Because the tip of the stud is applied under pressure to the base material in less time and the short current is controlled during this time, the splattering of molten metal is reduced by the pinch effect (a phenomenon in which the large current flowing through the molten fluid constricts the fluid, the constriction reduces the flow and lessens the constriction, and the lessening of the constriction once again constricts the molten fluid). As a result, the desired height below the neck in the stud after welding (L in FIG. 2) is reliably obtained, the reinforcement height (h in FIG. 2) and the diameter of the melted section of the base material (d in FIG. 2) are kept within the proper range, and high welding strength is maintained. Additional advantages and features of the present invention will become apparent from the following description and appended claims, taken in conjunction with the accompanying drawings.

DETAILED DESCRIPTION OF THE PREFERRED EMBODIMENT

Figure 3:
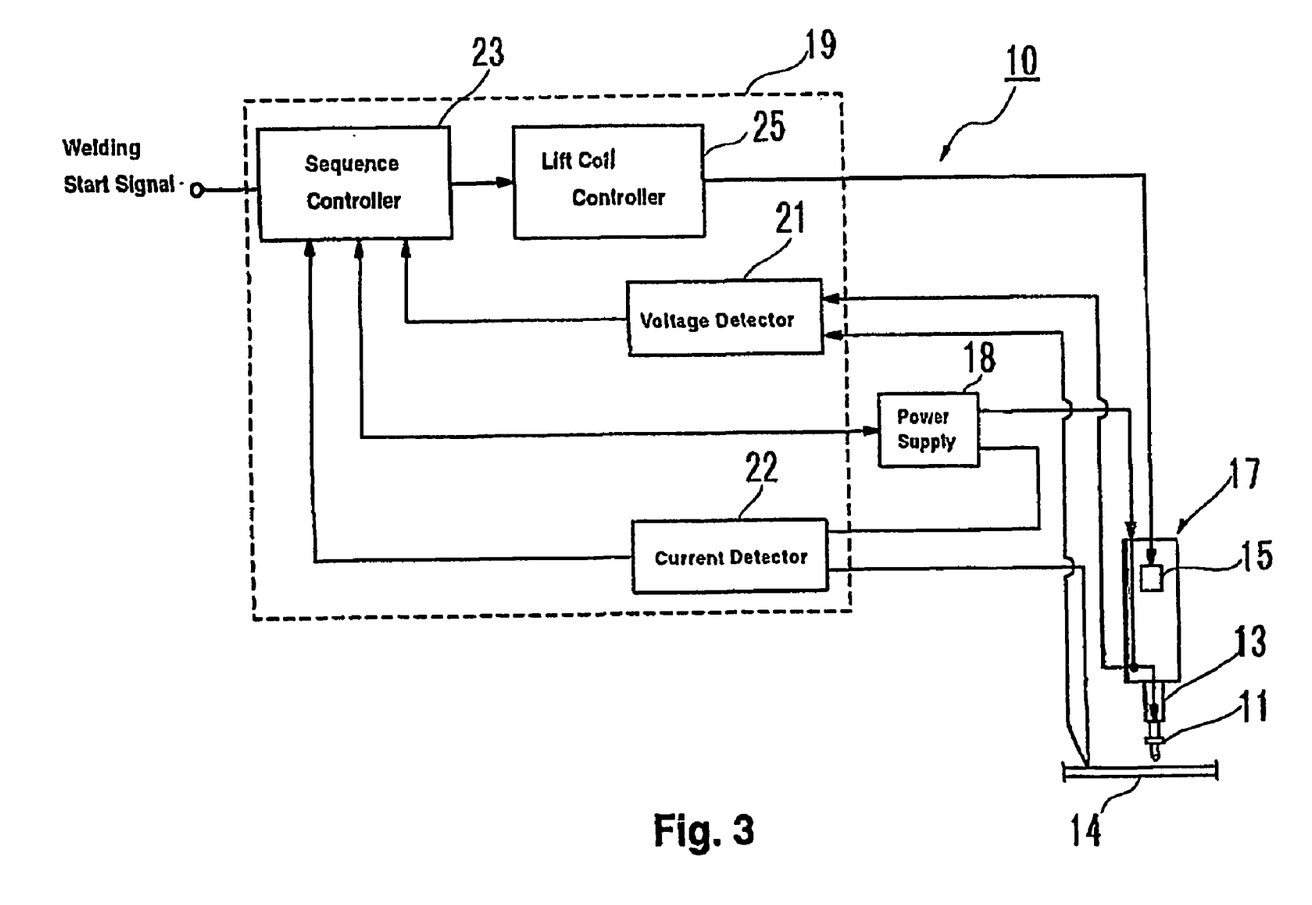
FIG. 3 is a block diagram of the circuit in the stud welding device of the present invention.

The following is an explanation of working examples of the present invention with reference to the drawings. FIG. 3 is a block diagram of the circuit in a welding device 10 for welding an aluminum or aluminum alloy stud to an aluminum or aluminum alloy base material. The stud welding device 10 contains a collet 13 for holding a stud 11 at the tip, a welding gun 17 with a lift coil 15 as the lifting means for lifting the stud 11 held by the collet 13 off the base material 14, and a power source 18 connected to the welding gun to supply a specific amount of power between the stud 11 and the base material 14. It is not necessary, but the stud can also be welded in an inactive gas atmosphere such as an argon gas atmosphere. A stud-surrounding member such as a ferrule (not shown) can be installed on the collet 13 holding the stud.

A control device 19 is connected to the power source 18 and the welding gun 17. The stud welding device 10 is a so-called drawn-arc stud welding device in which a stud 11 is brought into contact with a base material 14, voltage is applied between the stud and the base material, the stud is lifted slightly off the base material, a pilot arc with a small amount of current is generated, the main arc with a large amount of current is generated, the tip of the stud 11 and the section of the base material 14 to be melted are melted, pressure is applied to the stud and the section of the base material that has been melted and the stud and base material are welded together. Therefore, the control device 19 has to control the supply of power from the power source 18 to the welding gun 17 so a pilot arc and subsequent main arc are formed between the stud 11 and the base material 14. It also has to operate the lift coil 15 in the welding gun 17 so the stud 11 is lifted off the base material 14 to a specific height and the pilot arc and subsequent main arc are generated. After a certain amount of time, the lift coil 15 has to be turned off so the stud 11 is brought into contact with the base material 14 forcibly. In the present invention, a drawn-arc welding device in which a pilot arc precedes a main arc does not have to be used. Any welding device that generates an arc between the stud and base material for arc welding can be used. In the following explanation of the working example, however, a drawn-arc stud welding device is used.

The control device 19 has an arc voltage detector 21 for detecting the voltage between the stud 11 and the base material 14 and outputting a signal depending on whether the stud is in contact with the base material or lifted off the base material. It also has a current detector 22 for detecting the welding arc current supplied from the power source 18 to the welding gun 17. The detection signals outputted from detectors 21 and 22 are sent to a sequence controller 23 for controlling the sequence of operations required to perform stud welding. The output from the current detector 22 is in-putted to the sequence controller 23, and the sequence controller 23 controls the power source 18 so the current is reduced for the pilot arc and increased for the main arc.

In the present invention, the sequence controller 23 divides the supply of current into three stages from beginning to end while the main arc is being generated and increases the current incrementally. In dividing the main arc current into three stages, the sequence controller 23 performs control operations so the main arc in the first step is a small-current arc effective at removing oil from the surface and surroundings of the section of the base material to be melted, the main arc in the second step is an intermediate-current arc for melting the tip of the stud and the section of the base material to be melted and for keeping the area of the section of the base material to be melted within a predetermined range, and the main arc in the third step is a large-current arc for melting the tip of the stud and the section of the base material to be melted into each other deeply.

The control output from the sequence controller 23 does not have to be inputted to the power source 18. It can also be inputted to a lift coil controller 25 for turning the lift coil 15 on and off. The lift coil controller 25 turns on the lift coil 15 to lift the collet 13 in the welding gun 17 against resistance from an internal spring and raise the stud 11 a specific height with respect to the base material 14 and hold the stud there while the pilot arc is generated and the stronger main arc is generated. After the main arc has properly welded the tip of the stud 11 and the section of the base material 14 to be welded, the sequence controller 23 turns off the current to the lift coil 15 for bringing the stud 11 into contact with the base material 14 forcibly. When the power is turned off, the collet 13 is lowered by the spring action of the internal spring, and the stud 11 is brought into contact with the base material 14 forcibly.

Figure 4:
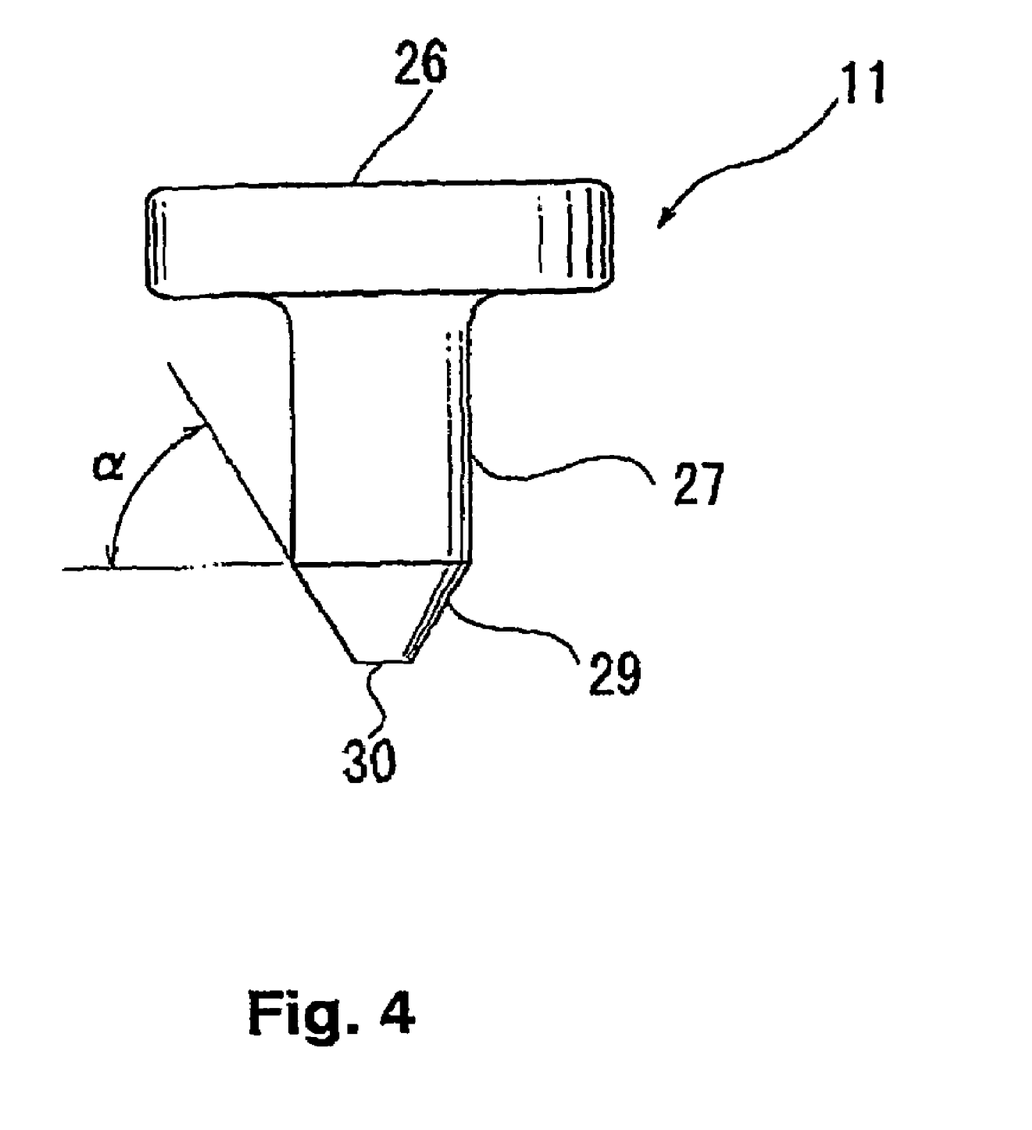
FIG. 4 is a front view of the aluminum-based T stud in the present invention.

FIG. 4 is a detailed depiction of the stud 11 used in the present invention. The stud 11 is made from aluminum or an aluminum alloy. It is a T stud with a large-diameter head 26 and a rod-shaped shaft. In order to be welded in the same manner as the iron-based stud 1 in FIG. 2, for example, the head 26 has a diameter of 5 mm and the shaft 27 has a diameter of 3 mm. The length of the shaft 27 before welding is 3.3 to 3.7 mm, or 0.3 to 0.7 mm longer than the iron-based stud 3 in FIG. 2. This allows for welding with the base material deep enough to obtain the appropriate welding strength. The tip 29 of the shaft 27 on the stud 11 is conical with a flat end. The tip surface 30 is flat with a 1.5 mm to 2 mm diameter, and the tapering angle $\alpha$ of the conical section is between 5 and 10°. The formation of a cone with a flat end concentrates the arc in the center, keeps the reinforcement from tilting to one side, and keeps the height of the reinforcement from getting shorter. By forming the tip 29 of the aluminum-based stud 11 of the present invention in this manner, the height of the stud 1 below the neck after being welded is about 2.6 mm, the reinforcing height (h) of the reinforcement is less than 1 mm, and the diameter (d) of the reinforcement is less than 5 mm. As a result, the welding strength is as high as the iron-based stud shown in FIG. 2.

Figure 5:
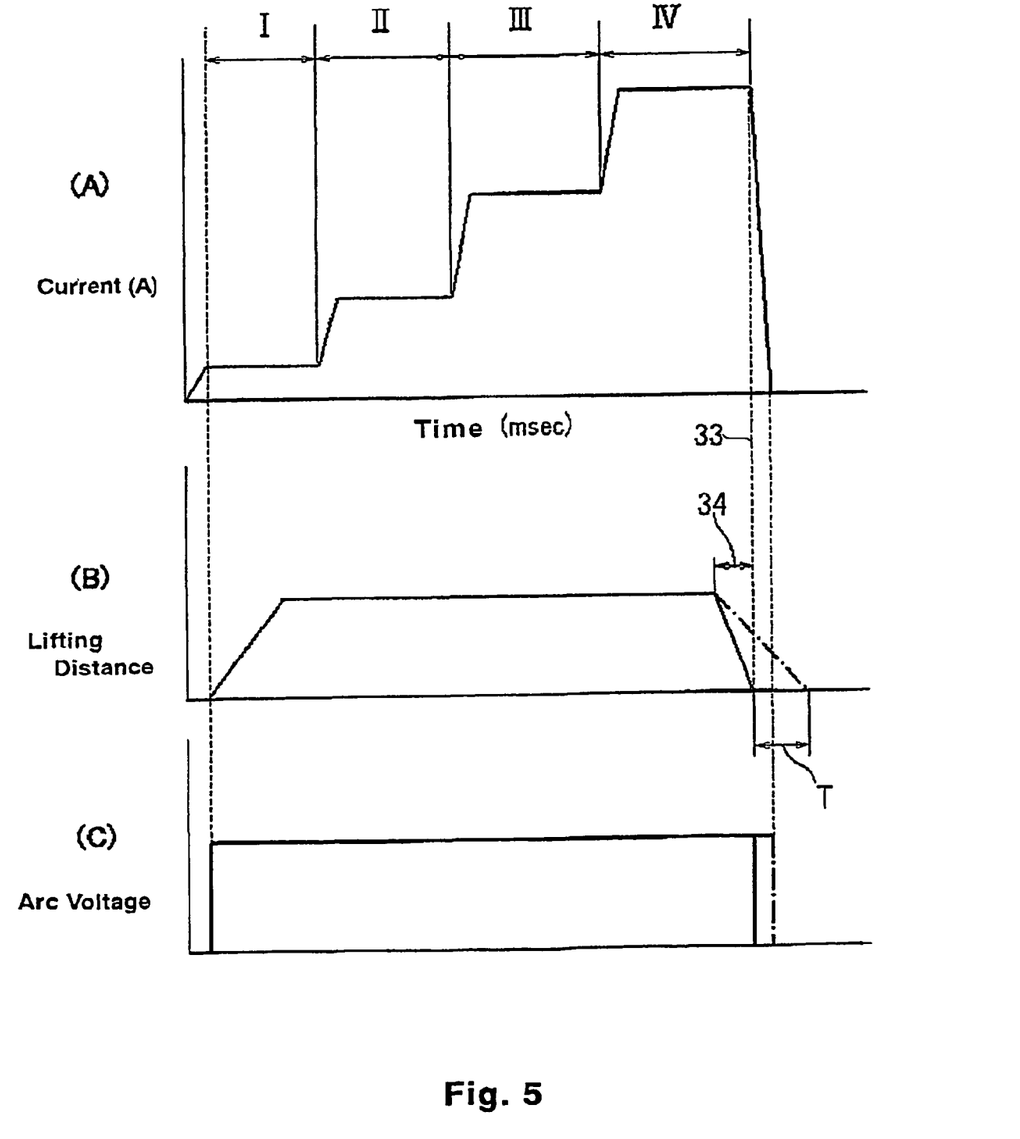
FIG. 5 shows graphs of the timing when an arc is generated by the stud welding device of the present invention wherein (A) is a graph showing the change in the arc current over time, (B) is a graph of the stud lift distance over time, and (C) is a graph of the arc voltage between the stud and the base metal over time.

The following is an explanation of the operation of the stud welding device 10 in the present invention with reference to FIG. 5(A) through (C). When a welding start signal is sent to the sequence controller 23 in the control device 19 from the switch (not shown), the constant-voltage pilot arc current is supplied from the power source 18 to the aluminum-based stud 11 and the aluminum-based base material 14 in the initial stage denoted by Phase I in FIG. 5(A). A signal is also sent to the lift coil controller 25, the lift coil 15 is activated, and the stud 11 is gradually lifted off the base material 14 against the resistance acting on the collet 13 as shown in FIG. 5(B). Once lifted, the pilot arc is generated. The stud 11 is kept at a specific height for a specific period of time. When the stud 11 is lifted from the base material 14, as shown in FIG. 5(C), a constant-level arc voltage is generated between the stud 11 and the base material 14. This is detected by the voltage detector 21 and sent to the sequence controller 23. The sequence controller 23 then makes sure the stud 11 is lifted off the base material 14.

After the pilot arc has been generated, the sequence controller 23 increases the current and supplies the main arc current from the power source 18 in the first stage to the stud in the second phase denoted by Phase 11 in FIG. 5(A). The main arc current in the first stage is set at a small-current arc effective enough at removing oil from the surface and surroundings of the section of the base material 14 to be melted. When performing the welding in an inactive gas atmosphere, the water component is scattered and does not contaminate the section of the stud to be melted. The small-current arc in the first stage is effective enough to perform pre-welding processing.

Next, the sequence controller 23 increases the current from the power source 18 and supplies the main arc current in the second stage to the stud 11 in the third phase denoted by Phase III in FIG. 5(A). The main arc current in the second stage welds the tip 29 of the stud 11 and the section of the base material 14 to be welded. This intermediate-current arc keeps the area of the section of the base material 14 to be melted within a predetermined range and positions the section to be melted with high precision.

In the fourth phase denoted by Phase IV after the third phase denoted by Phase III in FIG. 5(A), the sequence controller 23 increases the current even more and supplies the main arc current in the third phase from the power source 18 to the stud 11. The main arc current in the third stage is large enough to perform deep welding on the tip of the stud 11 and the section of the base material 14 to be welded. This is sufficient to weld the sections to be welded. The sequence controller 23 has a reference table stored in RAM or ROM memory containing data related to the welding of various types of studs and base materials. In Phases I, II, III and IV, the sequence controller 23 uses the signals from the voltage detector 21 indicating the stud 11 has been lifted as the initiation signals, and sets the proper timing and current levels accordingly. The power source 18 is a chopper high-frequency power source. The size of the current outputted is controlled by signals from an external source using pulse wave modulation (PWM). Therefore, the sequence controller 23 can set the appropriate pilot arc current and main arc current for the various stages and the appropriate length of time for the various stages based on the type of stud and base material being used.

When the third main arc in Phase IV is terminated, the main arc current from the power source 18 is stopped. In the present invention, the sequence controller 23 operates the lift coil controller 25 so the molten tip of the stud is forcibly brought into contact with the molten section of the base material to be welded in under 5 milli-seconds. Because the sequence controller 23 can check the reference table to determine when to end Phase IV (the third main arc stage), the current to the lift coil Is stopped at the appropriate time before the end of the process, and a signal is sent to the lift coil controller 25 to forcibly bring the tip of the stud 11 into contact with the molten section of the base material 14 to be welded in under 5 milliseconds in Phase IV or after the third main arc stage has ended. In the present invention, the amount of time in which the tip of the stud is brought into contact with the base material is shortened, and the short current is limited to a brief period of time. Because the short current is brief, the splattering of molten metal is reduced by the pinch effect (a phenomenon in which the large current flowing through the molten fluid constricts the fluid, the constriction reduces the flow and lessens the constriction, and the lessening of the constriction once again constricts the molten fluid). In testing, the period of forcible contact was conducted within 0 and 4 milliseconds of ending the current. This significantly reduced the amount of splattering of molten metal.

The time T in FIG. 5(B) is the range of time in which the tip of the stud is brought forcibly into contact with the base material after the main arc current has been terminated. After Phase IV in FIG. 5(A), the current does not go down to zero immediately after the current is cut. Because some power remains in the circuit for supplying power to the stud 11 and the base material 14, the current cutoff time is denoted by dotted line 33 in the Figure. A stud contact signal from the sequence controller 23 is sent to the lift coil controller 25 during time 34 in FIG. 5(B) before the time 30 the current is cut. When the stud makes contact, the arc voltage in FIG. 5(C) goes to zero. This is detected by the voltage detector 21. The sequence controller 23 receives the signals from the voltage detector 21 and begins the contact timing.

Figure 2:
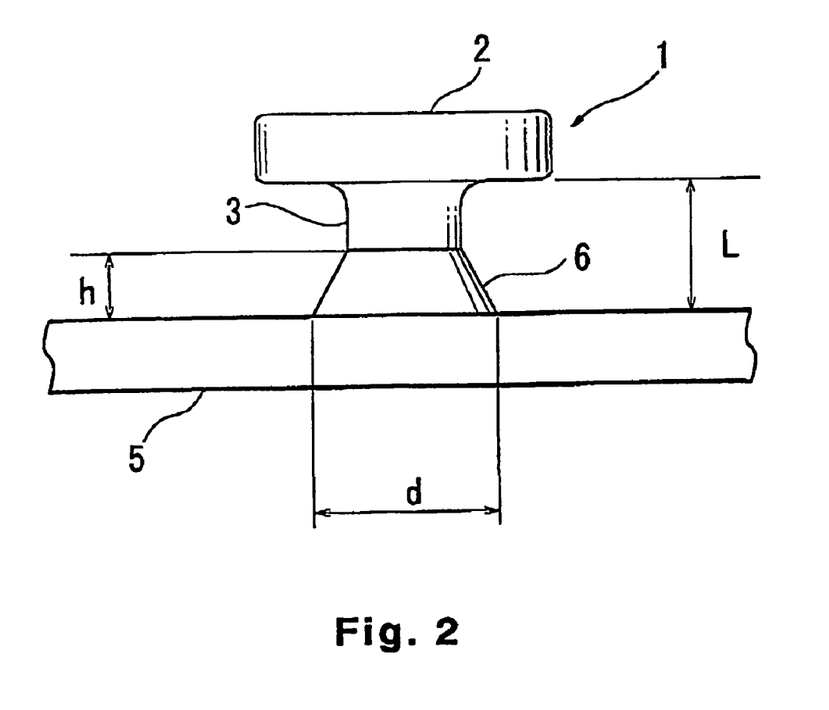
FIG. 2 is a front view of the iron-based stud in FIG. 1 after welding.

When an aluminum or aluminum alloy stud 11 is forcibly brought into contact with an aluminum or aluminum alloy base material 11, as shown in FIG. 2, the welding obtained is similar to that of a iron-based stud welded to an iron-based base material. In testing, the height of the aluminum-based stud 11 below the neck was about 2.6 mm, the reinforcing height (h in FIG. 2) of the reinforcement 6 was less than 1 mm, and the diameter (d in FIG. 2) of the reinforcement was less than 5 mm. A high welding strength was also maintained.

Because, in the present invention, the main arc current is divided into stages and increases incrementally in this welding method, the welding area of the section of the base material to be melted is kept within the desired range when the tip of the stud is being welded to the section of the base material to be melted, the tip of the stud and the section of the base material to be melted are melted into each other deeply, and the heat introduced to the stud and base material remains constant. Because the tip of the stud is applied under pressure to the base material in less time and the short current is controlled during this time, the splattering of molten metal is reduced by the pinch effect (a phenomenon in which the large current flowing through the molten fluid constricts the fluid, the constriction reduces the flow and lessens the constriction, and the lessening of the constriction once again constricts the molten fluid). This stabilizes the stud after welding at the desired height below the neck, keeps the height of the stud reinforcement and the diameter of the section to be welded within the appropriate ranges, and maintains a high welding strength. In addition, the aluminum-based stud is a T stud consisting of a large-diameter head and a rod-shaped shaft, and the profile of the end of the shaft is conical with a flat tip. As a result, the arc is concentrated in the center, the reinforcement does not tilt to one side, and the height of the reinforcement is kept from getting shorter.

Figure 6:
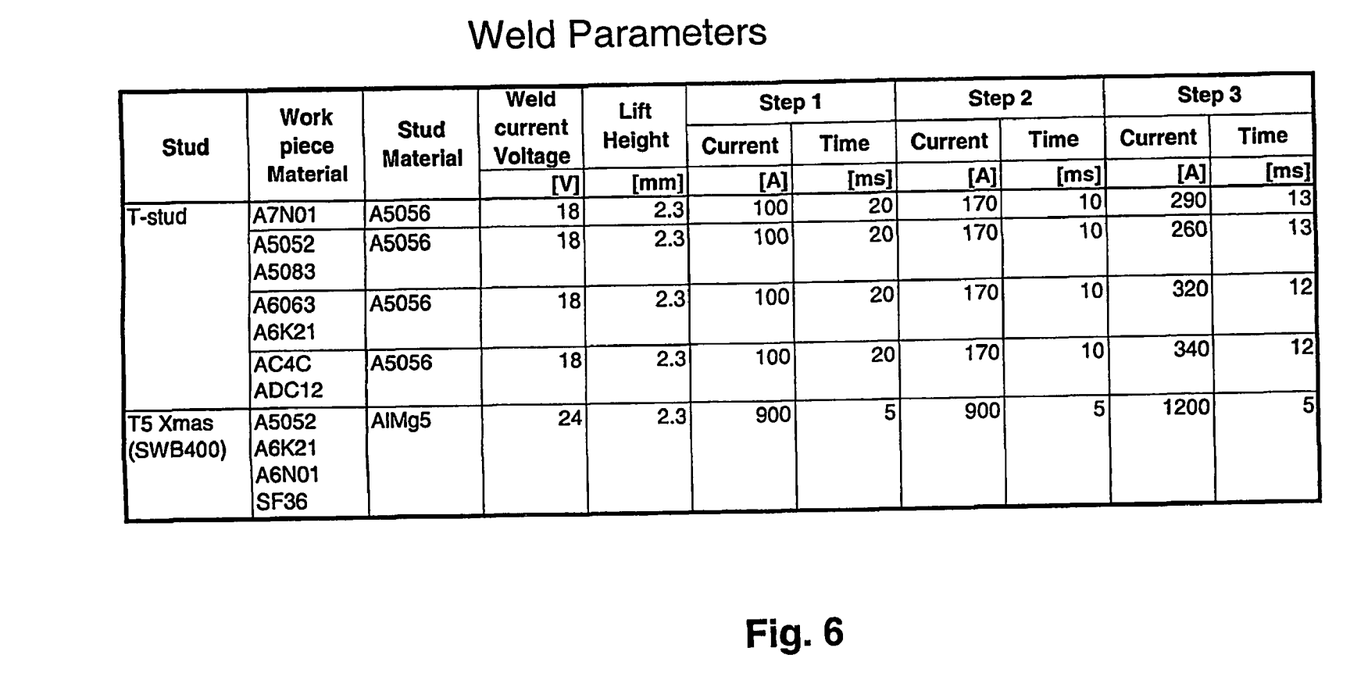
FIG. 6 is a chart showing the preferred weld parameters for different studs and materials.

The preferred weld parameters for the present invention are shown in FIG. 6. The weld parameters are first shown for different materials used with the previously disclosed T-stud. For example, when A7N01 is used for the base material 14 and A5056 is used for the stud 11, the weld current voltage is maintained at 18 volts, the lift height is maintained (for the lift motor or coil position relative to the workpiece although the welded tip may actually change as melting occurs) at 2.3 millimeters, the step 1 welding current average is maintained about 100 amps for about 20 milliseconds, the subsequent step 2 welding current average is maintained about 170 amps for about 10 milliseconds, and the subsequent step 3 welding current average is maintained about 290 amps for about 13 milliseconds. The final group of weld parameters are shown for a T5 Christmas ("Xmas") Tree style weld stud. The shape of this type of stud is disclosed in U.S. Pat. No. 5,461,209 entitled "Stud Bolt" which issued to Yamada et al. on Oct. 24, 1995, and is incorporated by reference herein.

Various aspects of the present invention have been disclosed but other embodiments can be used. For example, the preferred method and device can be used for weld studs which have differing shapes, such as those without a T-shaped or enlarged head, although some of the advantages may not be achieved. Furthermore, the stage timing, volts, amps and distances can be varied depending upon the specific stud and base material dimensions and materials utilized. While various materials and dimensions have been disclosed, it will be appreciated that other materials and dimensions may be readily employed. It is intended by the following claims to cover these and any other departures from the disclosed embodiments which fall within the true spirit of this invention.

The invention claimed is:

1. A welding method comprising:
    (a) an aluminum or aluminum alloy stud being brought into contact with an aluminum or aluminum alloy base material, the stud having a cylindrical shaft and a welding end with a substantially flat tip;
    (b) voltage being applied between the stud and the base material;
    (c) the stud being lifted slightly off the base material;
    (d) a pilot arc with a small amount of current being generated;
    (e) the main arc with a large amount of current being generated;
    (f) melting the tip of the stud and the section of the base material to be melted;
    (g) pressuring the molten tip of the stud against the molten base material in under five milliseconds after the main arc current has been cut off;
    (h) the end serving to centrally concentrate the main arc; and
    (i) welding together the stud and the base material.

2. The welding method of claim 1 wherein the stud is a T stud consisting of a large-diameter head and a smaller-diameter, rod-shaped shaft.

3. The welding method of claim 2 wherein a profile of the end of the shaft is conical with a substantially flat tip adjacent an enlarged portion of the conical end.

4. The welding method of claim 1 further comprising incrementally increasing current for the main arc into at least three steps, wherein the main arc in the first step is a small-current arc effective at removing oil from the surface and surroundings of the section of the base material to be melted, the main arc in the second step is an intermediate-current arc for melting the tip of the stud and the section of the base material to be melted and for keeping the area of the section of the base material to be melted within a predetermined range, and the main arc in the third step is a large-current arc for melting the tip of the stud and the section of the base material to be melted into each other deeply.

5. The welding method of claim 1 wherein the stud has, a substantially conical shape adjacent the welding end, the conical shape and end serving to centrally concentrate the main arc.

6. The welding method of claim 1 wherein steps (a) through (h) are performed substantially in sequential order.

7. The welding method of claim 1 wherein:
(i) the weld current voltage is about 18–24 volts and the weld current is about 100–900 amps for about 5–20 milliseconds during a first period;
(j) the weld current voltage is substantially unchanged and the weld current is increased to about 170–900 amps for about 5–10 milliseconds during a subsequent second period; and
(k) the weld current voltage is substantially unchanged and the weld current is increased to about 260–1200 amps for about 5–13 milliseconds for a subsequent third period.

8. A welding method comprising:
(a) contacting a stud with a base;
(b) applying voltage between the stud and the base;
(c) lifting the stud off the base;
(d) generating an arc;
(e) melting the tip of the stud and a section of the base;
(f) applying pressure to the tip of the stud and the section of the base that has been melted;
(g) dividing a main welding current into at least three stages and incrementally increased the welding current from the beginning stage to the end stage while maintaining the voltage substantially constant; and
(h) welding together the stud and base; wherein the stud is aluminum or aluminum alloy.

9. The welding method of claim 8 wherein the stud is a T stud consisting of a large-diameter head and a smaller-diameter, rod-shaped shaft.

10. The welding method of claim 9 wherein a profile of the end of the shaft is conical with a flat tip.

11. The welding method of claim 8 wherein the base is aluminum or an aluminum alloy.

12. The welding method of claim 8 wherein the stud has a cylindrical shaft, a substantially conical end extends from the shaft and a flat tip is on the conical end opposite the shaft.

13. The welding method of claim 8 further comprising moving the molten tip of the stud against the molten base in under five milliseconds after the arc current has been cut off.

14. The welding method of claim 8 further comprising incrementally increasing current for the main arc into at least three steps, wherein the main arc in the first step is a small-current arc effective at removing oil from the surface and surroundings of the section of the base to be melted, the main arc in the second step is an intermediate-current arc for melting the tip of the stud and the section of the base to be melted and for keeping the area of the section of the base to be melted within a predetermined range, and the main arc in the third step is a large-current arc for melting the tip of the stud and the section of the base to be melted into each other deeply.

15. The welding method of claim 8 wherein:
(i) the weld current voltage is about 18–24 volts and the weld current is about 100–900 amps for about 5–20 milliseconds during a first period;
(j) the weld current voltage is substantially unchanged and the weld current is increased to about 170–900 amps for about 5–10 milliseconds during a subsequent second period; and
(k) the weld current voltage is substantially unchanged and the weld current is increased to about 260–1200 amps for about 5–13 milliseconds for a subsequent third period.

16. The welding method of claim 8 wherein steps (a) through (h) are performed substantially in sequential order.

17. A welding system comprising:
an aluminum or aluminum alloy stud;
a base;
a first device operably applying voltage between the stud and the base; and
a second device operably lifting the stud slightly off the base;
wherein a pilot arc with a small amount of current is generated, a main arc with a large amount of welding current is generated, and the tip of the stud and the section of the base are melted;
wherein pressure is applied to the tip of the stud and the section of the base that has been melted;
wherein the welding current is divided into stages from beginning to end and increased as the main arc is generated;
wherein the molten tip of the stud is applied under pressure to the molten base in under five milliseconds after the main arc current has been terminated; and
wherein the stud and base are operably welded together.

18. The welding system of claim 17 wherein the stud is a T stud including a large-diameter head and a smaller-diameter, rod-shaped shaft.

19. The welding system of claim 18 wherein a profile of the end of the shaft is substantially conical with a flat tip.

20. The welding system of claim 17 wherein the base is aluminum or an aluminum alloy.

21. The welding system of claim 17 wherein the stud has a cylindrical shaft, a substantially conical end extends from the shaft and a flat tip is on the conical end opposite the shaft.

22. The welding method of claim 17 wherein:
(i) the welding current voltage is about 18–24 volts and the weld current is about 100–900 amps for about 5–20 milliseconds during a first period;
(j) the welding current voltage is substantially unchanged and the weld current is increased to about 170–900 amps for about 5–10 milliseconds during a subsequent second period; and
(k) the welding current voltage is substantially unchanged and the weld current is increased to about 260–1200 amps for about 5–13 milliseconds for a subsequent third period.

23. The welding system of claim 17 wherein there are three welding current stages and the main arc in the first stage is a small-current arc effective at removing oil from the surface and surroundings of the section of the base to be melted, the main arc in the second stage is an intermediate-current arc which operably melts the tip of the stud and the section of the base, and the main arc in the third stage is a large-current arc which operably melts the tip of the stud and the section of the base.

24. A welding system comprising:
an aluminum or aluminum alloy stud being a T stud including a large-diameter head, a smaller-diameter, rod-shaped shaft and a substantially conical shaft section adjacent a substantially flat tip;
an aluminum or aluminum alloy base; and
a welding device operable to weld the stud to the base;
wherein a pilot arc with a small amount of current is generated, the main arc with a large amount of welding current is generated, and the tip of the stud and the section of the base are melted;
wherein pressure is applied to the tip of the stud and the section of the base that has been melted;

wherein the welding current is divided into stages from beginning to end and incrementally increased as the main arc is generated:
  (a) the welding current voltage being about 18–24 volts and the weld current is about 100–900 amps for about 5–20 milliseconds during a first period;
  (b) the welding current voltage being substantially constant and the weld current is increased to about 170–900 amps for about 5–10 milliseconds during a subsequent second period; and
  (c) the welding current voltage being substantially constant and the weld current is increased to about 260–1200 amps for about 5–13 milliseconds for a subsequent third period; and
wherein the stud and base are operably welded together.

25. The welding system of claim 24 wherein there are three welding current stages and the main arc in the first stage is a small-current arc effective at removing oil from the surface and surroundings of the section of the base to be melted, the main arc in the second stage is an intermediate-current arc which operably melts the tip of the stud and the section of the base, and the main arc in the third stage is a large-current arc which operably melts the tip of the stud and the section of the base.

26. The welding system of claim 24 wherein the molten tip of the stud is applied under pressure to the molten base in under five milliseconds after the main arc current has been terminated.

* * * * *